United States Statutory Invention Registration [19]

[11] Reg. Number: H379

Alexander, Jr.

[43] Published: Dec. 1, 1987

[54] STRAIN RELIEF AND GROUND CONNECTOR FOR SHIELDED CABLE

[75] Inventor: Harry B. Alexander, Jr., Harrisburg, Pa.

[73] Assignee: E. I. Du Pont de Nemours and Company, Wilmington, Del.

[21] Appl. No.: 911,224

[22] Filed: Sep. 24, 1986

[51] Int. Cl.[4] ..... H01R 13/648
[52] U.S. Cl. ..... 439/610; 439/101
[58] Field of Search ..... 339/14 R, 103, 104, 339/107; 174/153 G

[56] References Cited

U.S. PATENT DOCUMENTS

| | | | |
|---|---|---|---|
| 2,472,986 | 5/1946 | Reder, Jr. | 173/322 |
| 3,229,026 | 7/1964 | Sulzer | 174/65 |
| 3,934,076 | 1/1976 | Smith | 174/87 |
| 4,289,923 | 9/1981 | Ebert . | |
| 4,477,132 | 10/1984 | Moser et al. | 339/14 |
| 4,613,191 | 9/1986 | Papa | 339/14 R |

FOREIGN PATENT DOCUMENTS

| | | | |
|---|---|---|---|
| 3311651 | 10/1984 | Fed. Rep. of Germany | 339/143 R |
| 905557 | 9/1962 | United Kingdom . | |

*Primary Examiner*—Deborah L. Kyle
*Assistant Examiner*—Michael J. Carone

[57] ABSTRACT

A strain relief has interally located clamping ribs and a connector and when the strain relief is located around a shield cable and then lodged in a notch in a grounded chassis the ribs engage the outer insulation of the cable and the shield is grounded via the connector and the chassis.

1 Claim, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STRAIN RELIEF AND GROUND CONNECTOR FOR SHIELDED CABLE

BACKGROUND OF THE INVENTION

This invention relates to an electrical ground connection for a shielded cable and more particularly to a combination strain relief and ground connection for a shielded cable.

Known strain relief techniques for cables having low tolerances in the range of ±0.0075 to ±0.020 inches consist of molding the grounding strain relief to the cable sealing of the cable with such low tolerances has been a problem, because if the strain relief is not tight enough, flash occurs. If too tight, the cable is pinched. Either is unacceptable.

SUMMARY OF THE INVENTION

The strain relief of the invention is of split construction of upper and lower housings ultrasonically bonded to each other about a shielded cable that has been stripped of insulation down to the shield at one location. The upper and lower housings are complimentary and have internal sharp ribs for gripping the insulation and the lower housing has a raised platform for engaging a contact and holding it against the shield. The outer surface of the mated housings includes a channel into which a deflectible finger extends for contact with a notch in a grounded chassis which serves to hold the housings and chassis together as well as connecting the finger of the contact to ground through the chassis.

DETAILED DESCRIPTION OF THE DRAWINGS

Figure 1:
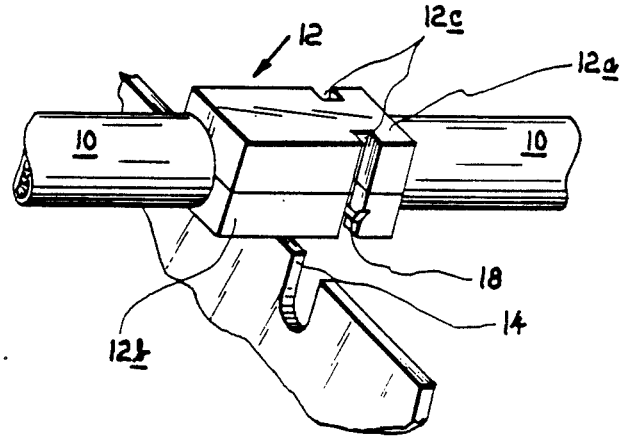
FIG. 1 is a perspective view of the strain relief before being inserted in the notch of the chassis.
Figure 2:
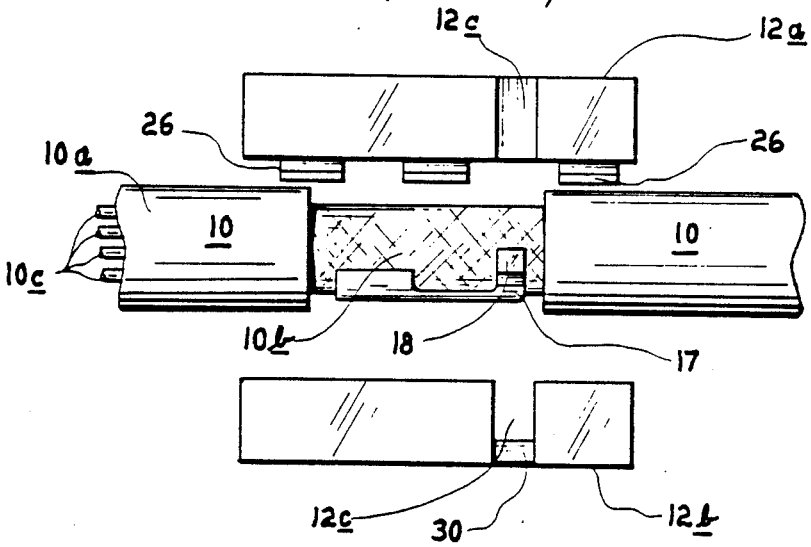
FIG. 2 is an exploded elevation of the strain relief spread apart from the cable.
Figure 3:
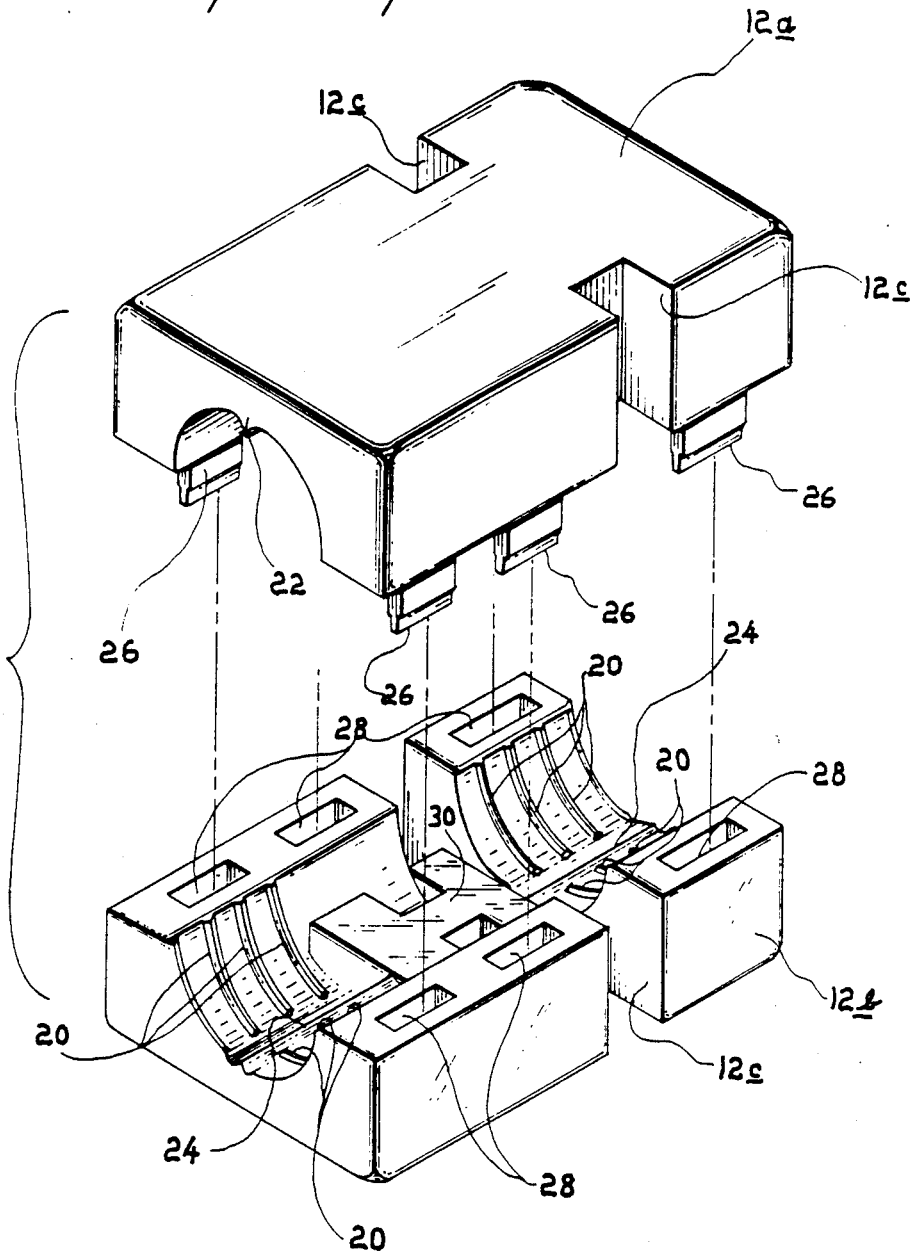
FIG. 3 shows the upper and lower housing of the strain relief enlarged and in perspective.

Referring now to FIGS. 1–3, the embodiment chosen for purposes of illustration includes a shielded cable 10, having a strain relief 12, comprised of upper and lower housings **12*a*, 12*b*, respectively, positioned thereon. The strain relief includes an exterior channel 12*c* into which a finger 18 extends. The strain relief is shown prior to being inserted into notch 14 of electrically grounded chassis 16. The cable 10 is prepared to received grounding strain relief 12 by having its outer layer of insulation 10*a* stripped at a location to exposed the flexible conductive shield 10*b* which is in the form of a braided screen sheath comprised of wire filaments braided together and concentrically arranged around inner connectors 10*c*. A contact 17 having an extending deflectible finger 18 is shown (FIG. 2) engaging the shield 10*b***.

The internal part of the upper and lower housings of the strain relief is best shown in FIG. 3 wherein a series of spaced radial ribs 20 with sharp edges are positioned opposite each other in the upper and lower housings and a longitudinal ribs 22,24 with sharp edges are formed in the upper and lower housings respectively. The sharp edges grip any material into which they are inserted. Tabs 26 on upper housing **12*a* extend downwardly and are sized to be a slip fit into rectangular holes 28 to provide a mating alignment of the upper and lower housings when they are placed together around a cable and ultrasonically bonded. A platform 30 formed intermediate the ends of lower housing 12*b* serves to engage contact 17 and hold it against shield 10*b* when the housings are mated around cable 10**.

In assembling the strain relief 12 on a cable 10, the cable is first prepared as pointed out above by removing the insulation **10*a* at a location on the cable to expose the shield 10*b*, then contact 17 is positioned against the shield 10*b* and upper and lower housings 12*a*, 12*b* are mated to each other at the location on the cable where the shield is exposed. After the housings are ultrasonically bonded to each other so that finger 18 of contact 17 extends into channels 12*c* formed on the outside of strain relief 12, the strain relief is inserted via channels 12*c* into notch 14 of chassis 16 bringing finger 18** into contact with the chassis.

When the housings **12*a*, 12*b* are mated, tabs 26 lock into holes 28 and clamp the housings with sufficient force to cause penetration of the outer insulation of cable 10 by sharp edges of ribs 20, 22, and 24** while ultrasonic bonding takes place.

Preferably the moldable insulating material used to form housings **12*a* and 12*b*** is ABS/polycarbonate copolymer or "Noryl" or "Trevex" polycarbonate copolymers.

I claim:

1. A strain relief connector for establishing an electrical connection between a grounded chassis and a location on an insulated cable having a flexible conductive shield beneath an outer layer of insulation said insulation being removed at said location said connector comprising: an electrical conductive contact engaging said shield and having a deflectible finger extending therefrom; upper and lower housing of electrical insulating material, having longitudinal and spaced radial clamping ribs with sharp edges and a raised platform in said lower housing for engaging said contact, said housings being ultrasonically bonded to each other at said location in a closed position and forming an exterior channel on opposite sides into which said contact finger extends and a notch in said chassis for receiving the channel and positioning the upper and lower housings with respect to the chassis, the sharp edges of the ribs projecting into the insulation to secure the housings to the cable and the platform pressing against the contact holding it against the flexible conductive shield to form an electrical contact, said finger being in contact with said chassis within said notch.

* * * * *